United States Patent
Solbrig

(10) Patent No.: US 7,178,328 B2
(45) Date of Patent: Feb. 20, 2007

(54) SYSTEM FOR CONTROLLING THE UREA SUPPLY TO SCR CATALYSTS

(75) Inventor: Charles E. Solbrig, Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 49 days.

(21) Appl. No.: 11/017,363

(22) Filed: Dec. 20, 2004

(65) Prior Publication Data

US 2006/0130458 A1 Jun. 22, 2006

(51) Int. Cl.
*F01N 3/00* (2006.01)
*F01N 3/10* (2006.01)

(52) U.S. Cl. .............. 60/286; 60/287; 60/299; 60/301

(58) Field of Classification Search .......... 60/282, 60/286, 287, 299, 301
See application file for complete search history.

(56) References Cited

U.S. PATENT DOCUMENTS

| | | | | |
|---|---|---|---|---|
| 4,403,473 A | * | 9/1983 | Gladden | 60/274 |
| 4,473,536 A | * | 9/1984 | Carberg et al. | 423/239.1 |
| 4,963,332 A | * | 10/1990 | Brand et al. | 423/235 |
| 5,522,218 A | * | 6/1996 | Lane et al. | 60/274 |
| 5,628,186 A | * | 5/1997 | Schmelz | 60/274 |
| 5,643,536 A | * | 7/1997 | Schmelz | 422/105 |
| 5,785,937 A | * | 7/1998 | Neufert et al. | 423/213.2 |
| 5,833,932 A | * | 11/1998 | Schmelz | 422/180 |
| 5,842,341 A | * | 12/1998 | Kibe | 60/274 |
| 5,845,487 A | * | 12/1998 | Fraenkle et al. | 60/274 |
| 6,546,720 B2 | * | 4/2003 | van Nieuwstadt | 60/286 |
| 6,662,553 B2 | * | 12/2003 | Patchett et al. | 60/286 |
| 2004/0040289 A1 | * | 3/2004 | Mazur et al. | 60/295 |

* cited by examiner

*Primary Examiner*—Thomas Denion
*Assistant Examiner*—Loren Edwards
(74) *Attorney, Agent, or Firm*—Christopher DeVries

(57) ABSTRACT

A reductant dosing control system, for use in a Selective Catalytic Reduction (SCR) system of a motor vehicle includes an input receiving a NOx feedback signal from an NOx sensor provided to the SCR system. A base dosing module calculates a required quantity of reductant to inject in front of a SCR catalyst of the SCR system based on the NOx feedback signal. The SCR catalyst has ammonia storage properties. An output signals a reductant metering mechanism to periodically or continuously inject excess reductant based on the required quantity of reductant.

16 Claims, 13 Drawing Sheets

Final Urea Solution Quantity Limiting Calculations

Reset Integrators

CAN Receive Logic

SYSTEM FOR CONTROLLING THE UREA SUPPLY TO SCR CATALYSTS

FIELD OF THE INVENTION

The present invention generally relates to diesel engine control systems, and more particularly to intermittent or continuous reductant supply to Selective Catalytic Reduction (SCR) catalysts based on feedback from an engine out NOx sensor.

BACKGROUND OF THE INVENTION

Selective Catalytic Reduction (SCR) of NOx using urea as a reductant is well established for NOx emissions reduction on stationary sources and mobile applications. In the SCR process, NOx reacts with a reductant, such as pure anhydrous ammonia, aqueous ammonia, and/or urea, which is injected into the exhaust gas stream before a special SCR Catalyst. The SCR approach significantly reduces diesel NOx.

The SCR process requires precise control of the reductant injection rate. Insufficient injection may result in unacceptably low NOx conversion. An injection rate that is too high may release reductant to the atmosphere. The current dosing control system uses open loop dosing maps, based on engine speed and load, with temperature modifiers to lookup the required dosing quantity. However, the open loop controller logic may not result in optimum NOx emissions elimination, perhaps due to transient operation with low levels of emissions. Due in part to minimum practical settings on reductant dosing mechanisms, it is difficult to precisely supply reductant at these low levels without slippage of reductant into the atmosphere.

SUMMARY OF THE INVENTION

A reductant dosing control system, for use in a Selective Catalytic Reduction (SCR) system of a motor vehicle includes an input receiving a NOx feedback signal from an NOx sensor provided to the SCR system. A base dosing module performs a calculation of a quantity of reductant to inject in front of a SCR catalyst of the SCR system based on the NOx feedback signal, wherein the SCR catalyst has NH3 storage properties. An output signals a reductant metering mechanism to periodically or continuously supply an excess amount of reductant based on the calculation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 1:
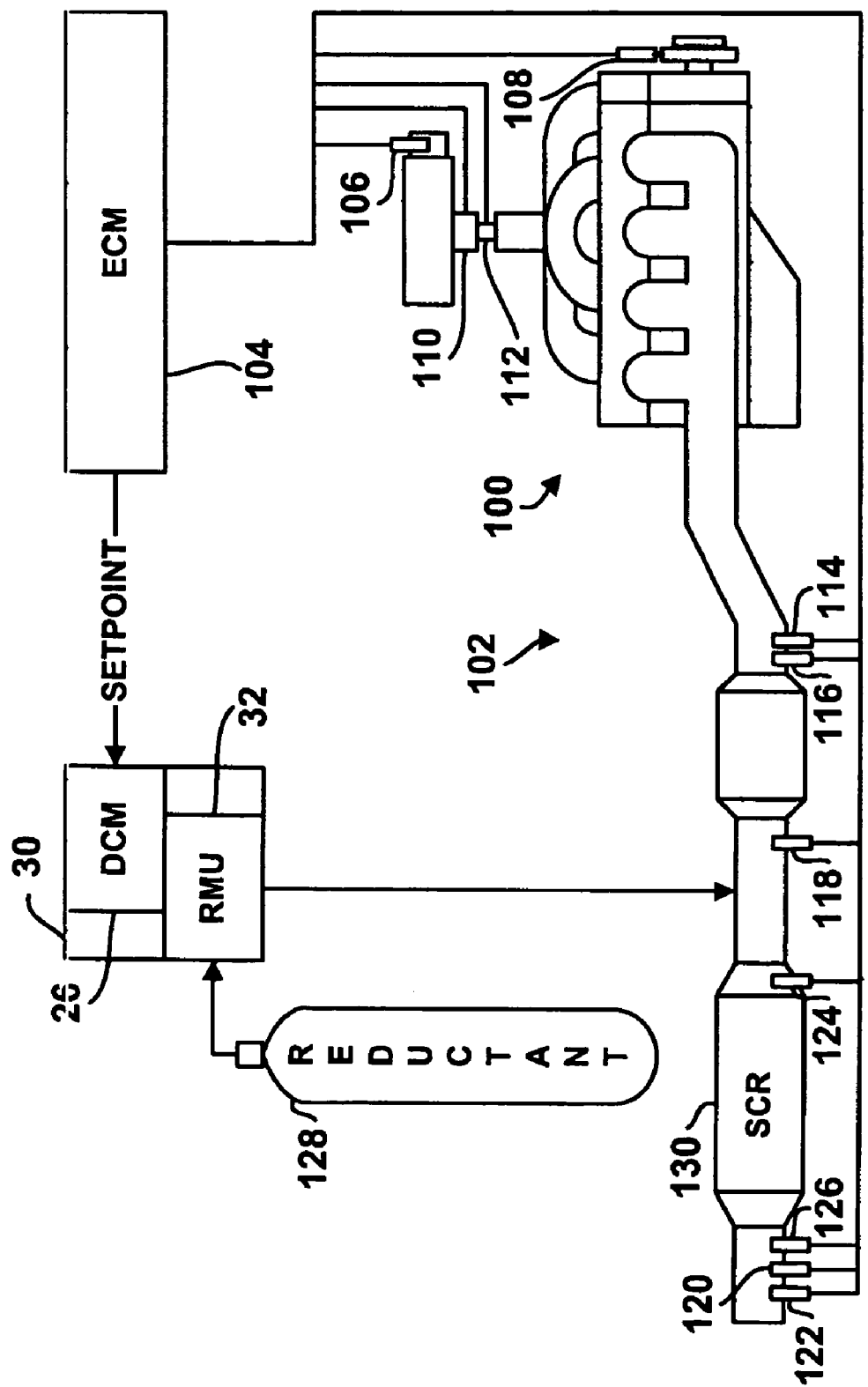
FIG. 1 is a functional block diagram of a diesel engine including a selective catalytic reduction system according to the present invention.

By way of overview, FIG. 1 illustrates a selective catalytic reduction system in accordance with the present invention. Therein, diesel engine 100 exhausts NOx into exhaust system 102. Electronic control module 104 receives sensory signals from a plurality of sensors provided to engine 100 and exhaust system 102. These sensors include mass air flow sensor 106, engine speed sensor 108, intake air temperature sensor 110, throttle position sensor 112, engine out NOx sensor 114, exhaust temperature sensors 116, 118, and 120, SCR catalyst out NOx sensor 122, and/or Delta pressure sensors 124 and 126.

It should be readily understood that SCR and Diesel Particulate Filter (DPF) systems may exist separately or together in the same vehicle. While filters can be employed to remove particulate matter from engine exhaust in accordance with DPF, SCR can chemically alter the chemical structure of gaseous emissions using a catalyst that retains the noxious emissions as a non-gaseous product of the chemical reaction. Accordingly, Delta pressure sensors 124 and 126 can be employed in a combined SCR/DPF system according to the present invention, or left out in an SCR only embodiment of the present invention.

Electronic control module 104 uses one or more sensor signals, including a signal from engine out NOx sensor 114, to calculate a reductant dosing set point and communicate the setpoint, such as a voltage level, to dosing control module 26 of reductant dosing system 30. In turn, dosing control module 26 causes reductant metering unit 32, such as a solenoid actuated valve, to inject reductant from reductant supply 128 into exhaust system 102 at a point before an SCR catalyst 130. For example, the set point voltage opens the valve to a position allowing reductant to pass at predetermined rate. As the voltage set point changes, the rate of injection changes accordingly.

According to one aspect of the invention, a range of the reductant dosing system 30 is extended by overcoming the minimum set point limitation of the reductant metering unit 32. For example, there is a minimum opening position of a valve, and therefore a minimum rate of reductant injection. Accordingly, the present invention includes intermittently injecting reductant into the exhaust system at a given rate before the catalyst for periods of time separated by durations of no injection. Accordingly, the set point is changed to zero during the durations of no injection. In a preferred embodiment described below with reference to FIGS. 2–8, the period of injection has a predetermined length, while the rate of injection and the duration of no injection are variable. However it is envisioned that any of these three factors may be fixed, while at least one of the other factors is varied. It is also envisioned that all of the factors may be varied. A Zeolite based SCR catalyst is presently preferred to maintain high conversion efficiency across the catalyst with intermittent injection. However, it should be readily understood that other, substantially equivalent catalysts may be employed that have ammonia storage properties.

Figure 2:
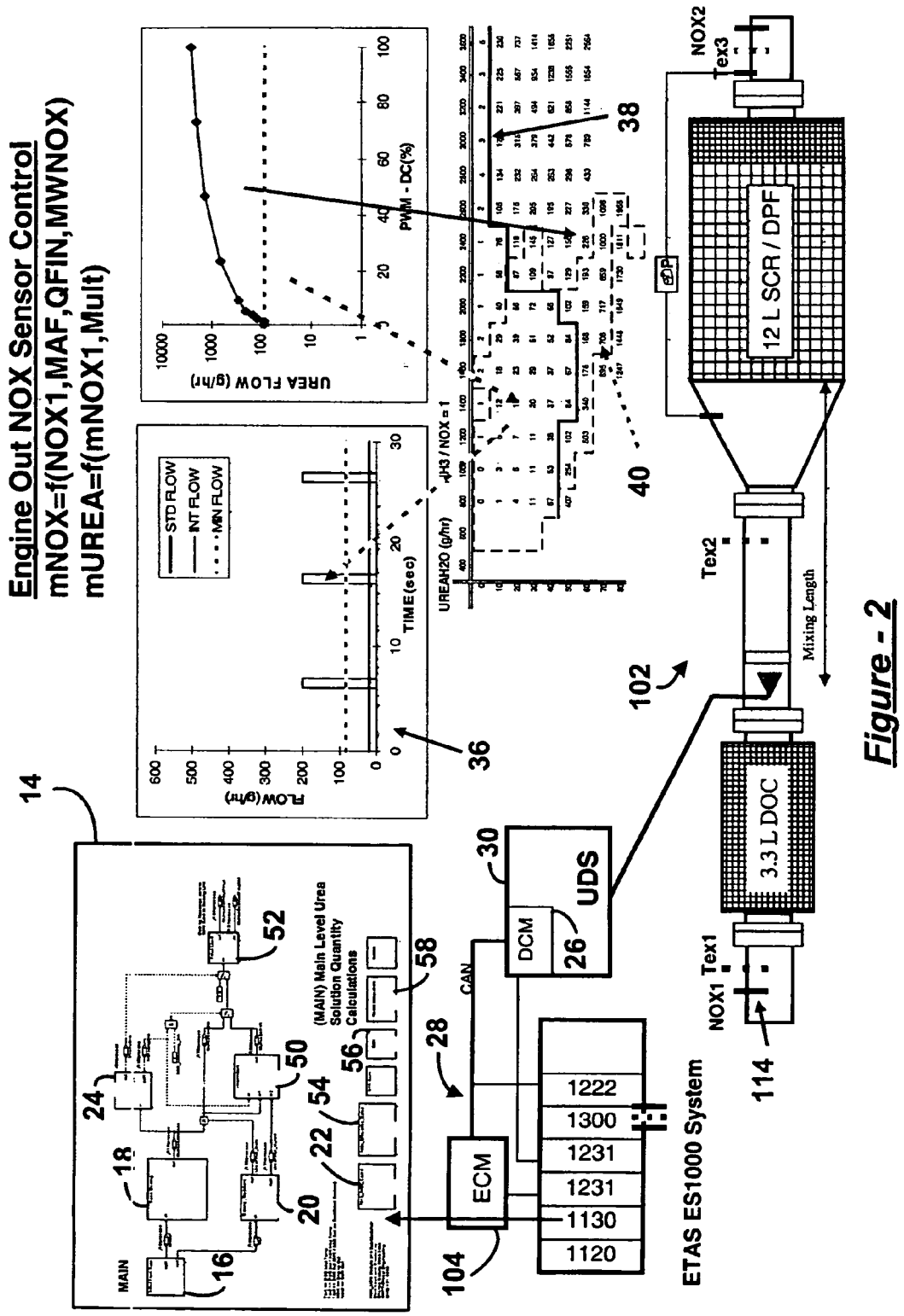
FIG. 2 is a block diagram of an SCR system in accordance with the present invention.

FIG. 2 illustrates the presently preferred embodiment of a Selective Catalytic Reduction (SCR) system for use in an automotive vehicle in accordance with the present invention. Accordingly, electronic control module 104 employs a reductant dosing control system 14 to calculate the set point for reductant dosing system 30. The preferred embodiment employs urea as a reductant. The reductant dosing control system 14 includes NOx Flow Rate determination module 16, Base Dosing module 18, Urea Dosing Quantity Modifier calculation module 20, Intermittent Dosing module 50, Enable Logic module 24, Final Limit application module 52, Concentration Calculations module 22, Efficiency Calculations module 54, CAN module 56, and Reset Integration module 58. Electronic control module 104 employs dosing control system 14 to affect operation of dosing control module 26. Dosing control module 26 is in communication with electronic control module 104 via CAN bus 28.

Dosing control module 26 operates reductant dosing system 30 to inject urea into exhaust system 102. Feedback from real time engine out NOx sensor 114 is used to calculate a required urea quantity during a standard (i.e., constant injection) dosing mode and intermittent dosing mode in accordance with the present invention.

The dosing control strategy of the presently preferred embodiment includes three primary steps to calculate and supply the correct (setpoint) amount of urea reductant to the exhaust system. For example, a signal is used from real time NOx (feedback) sensor 114 to calculate the correct amount of urea required to inject in front of a Zeolite based SCR catalyst to maintain optimum performance (NOx conversion efficiency). Also the operation of an existing dosing unit is enhanced by extending the low end operation through a process called intermittent dosing. This process periodically supplies an excess amount of urea and uses the ammonia storage properties of a Zeolite based SCR catalyst to maintain high conversion efficiency across the catalyst when the reductant dosing system 30 (when used as designed) could not otherwise supply any urea solution. Further, input is used from other sensors, such as engine mass air flow, and temperature sensors to calculate modifiers to tailor the calculated urea quantity to the physical conditions of the catalyst, such as temperature and space velocity.

Figure 5:
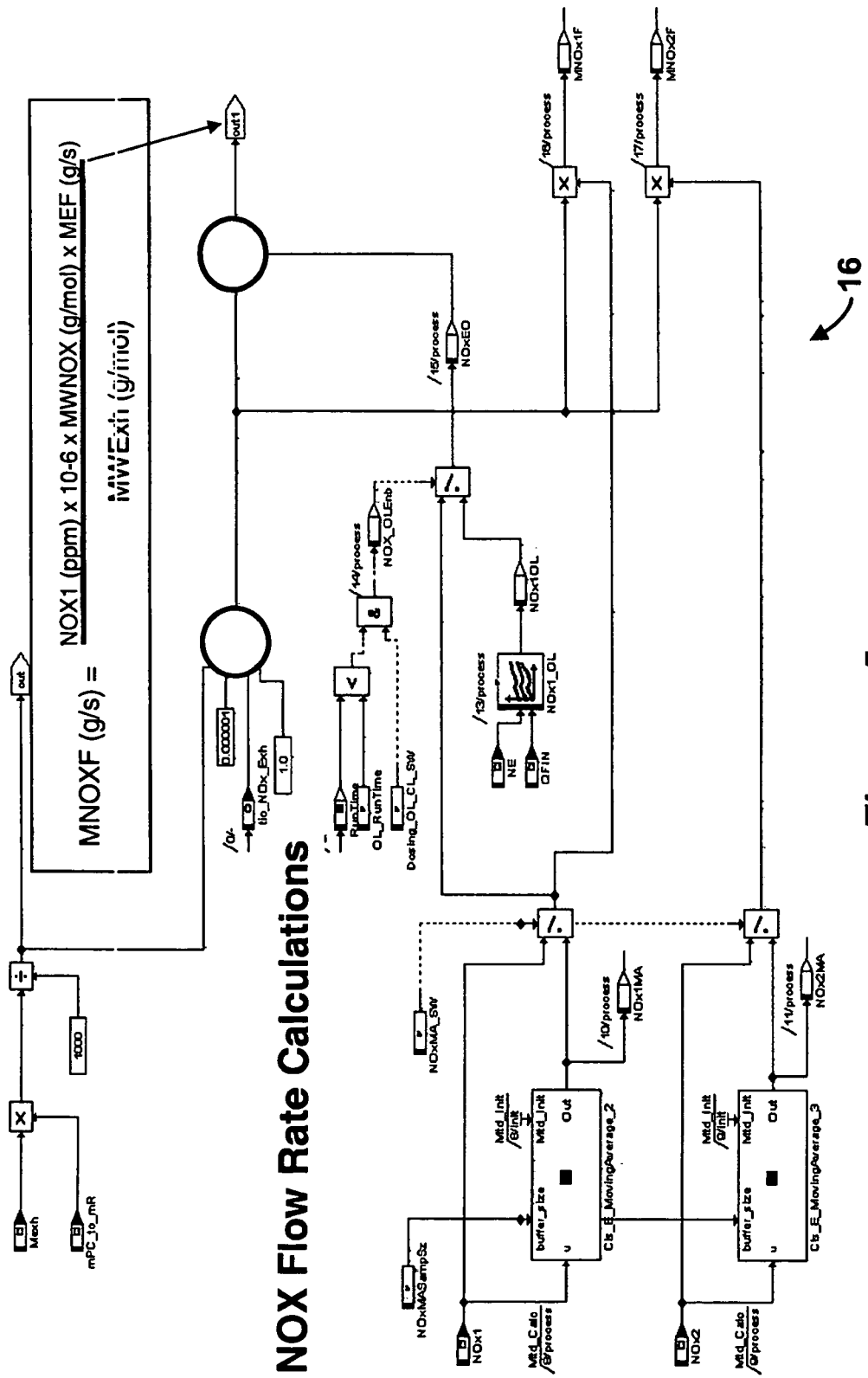
FIG. 5 is a block diagram of a NOx flow rate determination module in accordance with the present invention.

Turning now to FIGS. 4–13, reductant dosing control system 14 (FIG. 4) is described in detail. As illustrated in FIG. 5, in NOx flow rate determination module 16 (FIG. 5), the NOx sensor signal supplies the PPM signal and it is converted to a mass per time signal using air flow rate+fuel flow rate as exhaust flow rate (not shown but supplied to 0, Mexh), and NOX and exhaust molecular weights (shown and calculated in concentration calculations module 22 (FIG. 4), MW_NOX, MW_Exh). The main outputs of NOx Flow Rate determination module 16 are NOX Flow Rate (MNOXF, g/s) and Mass Exhaust Flow (MEF, g/s).

Figure 6:
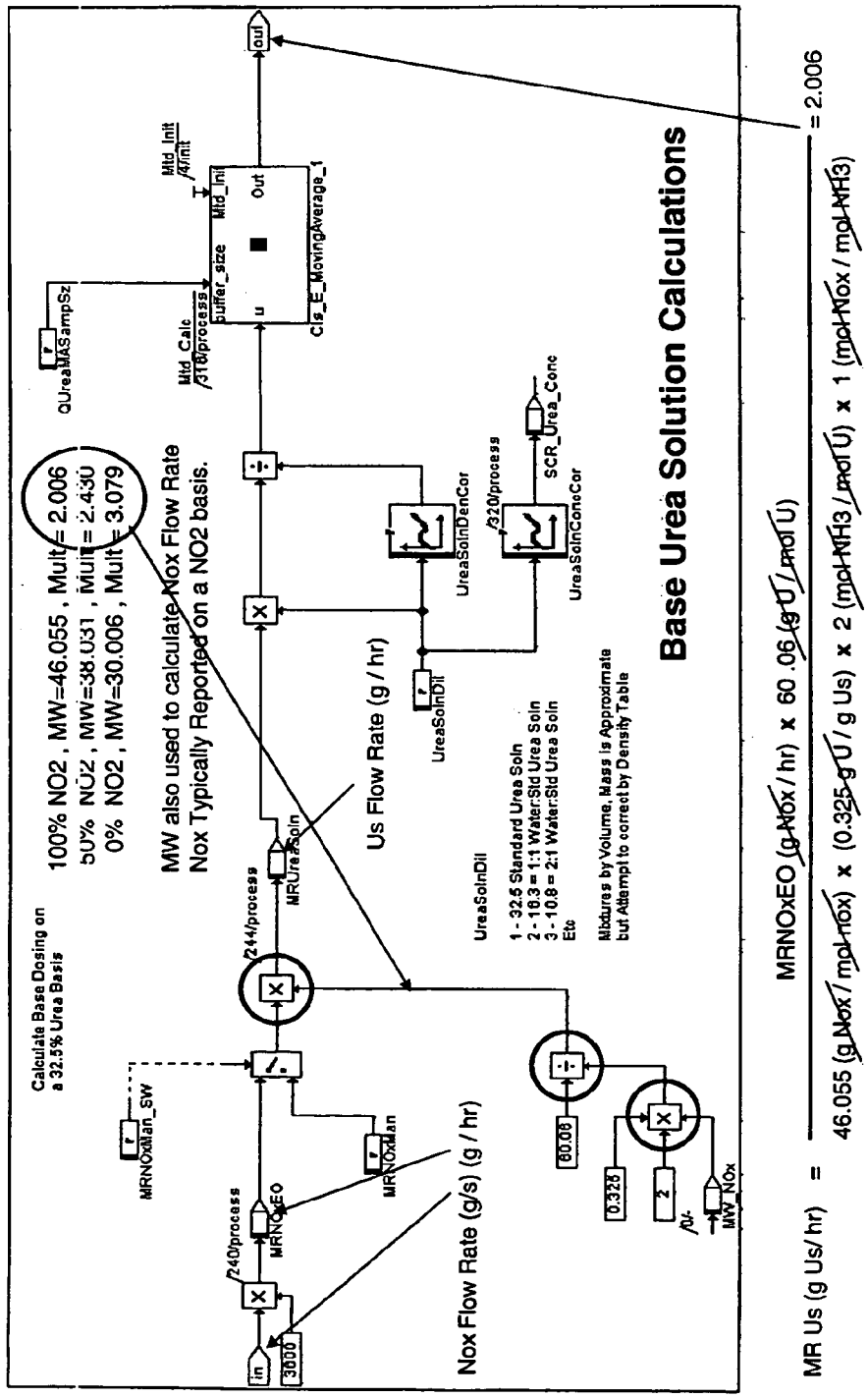
FIG. 6 is a block diagram of a base dosing module in accordance with the present invention.

In base dosing module 18, and as further illustrated in FIG. 6, a stoichiometric dosing amount of urea solution is calculated from the NOX Flow Rate (MNOXF) using the urea to ammonia decomposition properties (2 mol NH3 for 1 mol Urea) and the molecular weights of urea and NOx; this amount is calculated for a 32.5% urea/water solution (which is the standard concentration available). The base setpoint dosing quantity is then corrected for additional dilution (with water, for dilution and density) and filtered to reduce noise. The main output of base dosing module 18 is base urea solution flow rate (QUreaSolnBase, g/hr).

Figure 7:
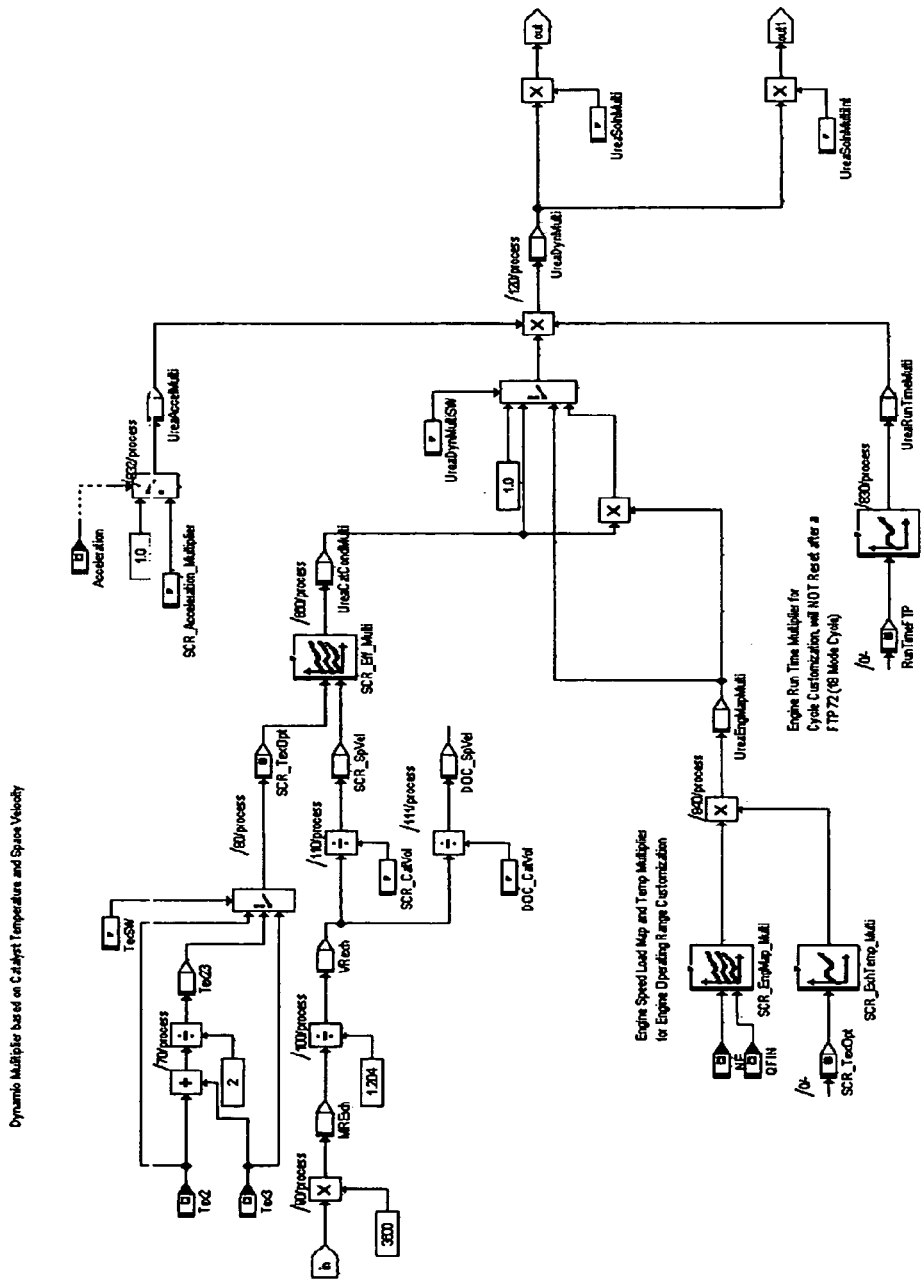
FIG. 7 is a block diagram of a urea dosing quantity modifier calculation module in accordance with the present invention.

Returning to FIG. 4, in urea dosing quantity modifier calculation module 20, urea dosing quantity modifiers in the form of multipliers are calculated for engine and/or catalyst operating conditions as illustrated in FIG. 7. Two main types of modifiers are calculated. First, a modifier based on catalyst conditions (temperature (SCR_TexOpt) and space velocity (SCR_SpVel)) is determined (UreaCatCondMulti), and second a modifier based on engine speed and load, and catalyst temperature (UreaEngineMapMulti) is determined. The final base modifier can be a function of either or both of these methods (which ever best suits the situation). Two other modifiers are then included (one based on engine run time and engine acceleration) before the final modifiers are applied. There are two final modifiers, one for standard operating mode and one for intermittent operating mode. Returning to FIG. 4, the main outputs of urea dosing quantity modifier calculation module 20 are a standard mode modifier (UreaFinal_Multi) and an intermittent mode modifier (UreaFinal_MultiInt). These modifiers are multiplied to the urea base solution flow rate (QUreaSolnBase, g/hr) in MAIN to get (QUreaSolnStd) and is supplied to intermittent dosing module 50, and enable logic module 24.

Figure 8:
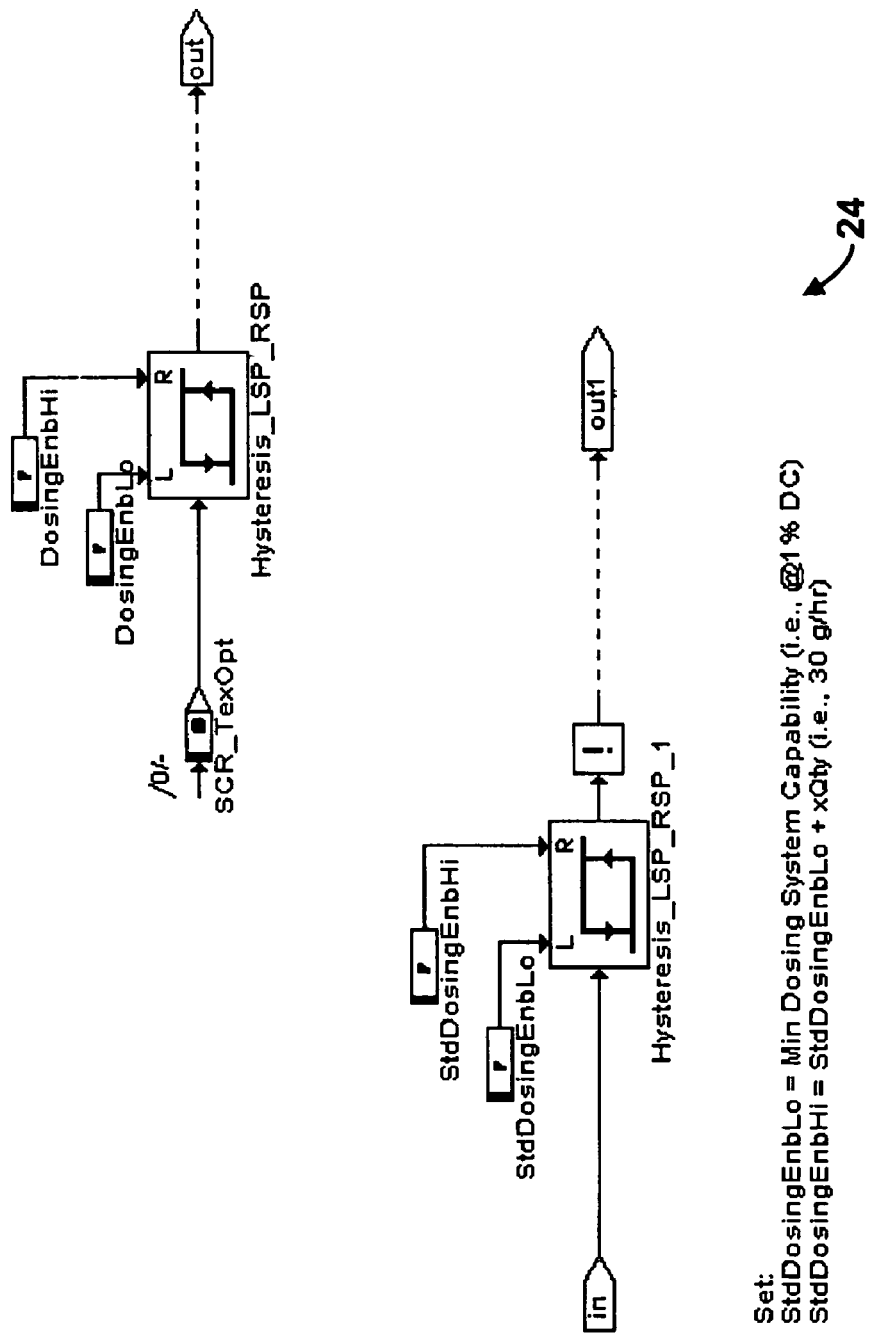
FIG. 8 is a block diagram of an enable logic module according to the present invention.

Turning to FIG. 8, in enable logic module 24, a decision is made to determine if the required urea quantity can be supplied by the existing dosing System (due to minimum dosing limitations). Returning to FIG. 4, if the dosing quantity meets the dosing system's minimum dosing requirement, (QUreaSolnStd, g/hr) is passed to final limit application module 52. Otherwise, the intermittent dosing mode is enabled and the intermittent dosing quantity (QUreaSolnInt, g/hr) calculated by intermittent dosing module 50 is passed to final limit application module 52. Returning now to FIG. 8, enable logic module 24 also determines whether urea dosing should occur at all based on SCR catalyst temperature (SCR_TexOpt, C). Returning to FIG. 4, the main outputs of enable logic module 24 are a dosing enable flag (DosingEnb) and an intermittent dosing enable flag (IntDosingEnb).

Figure 9:
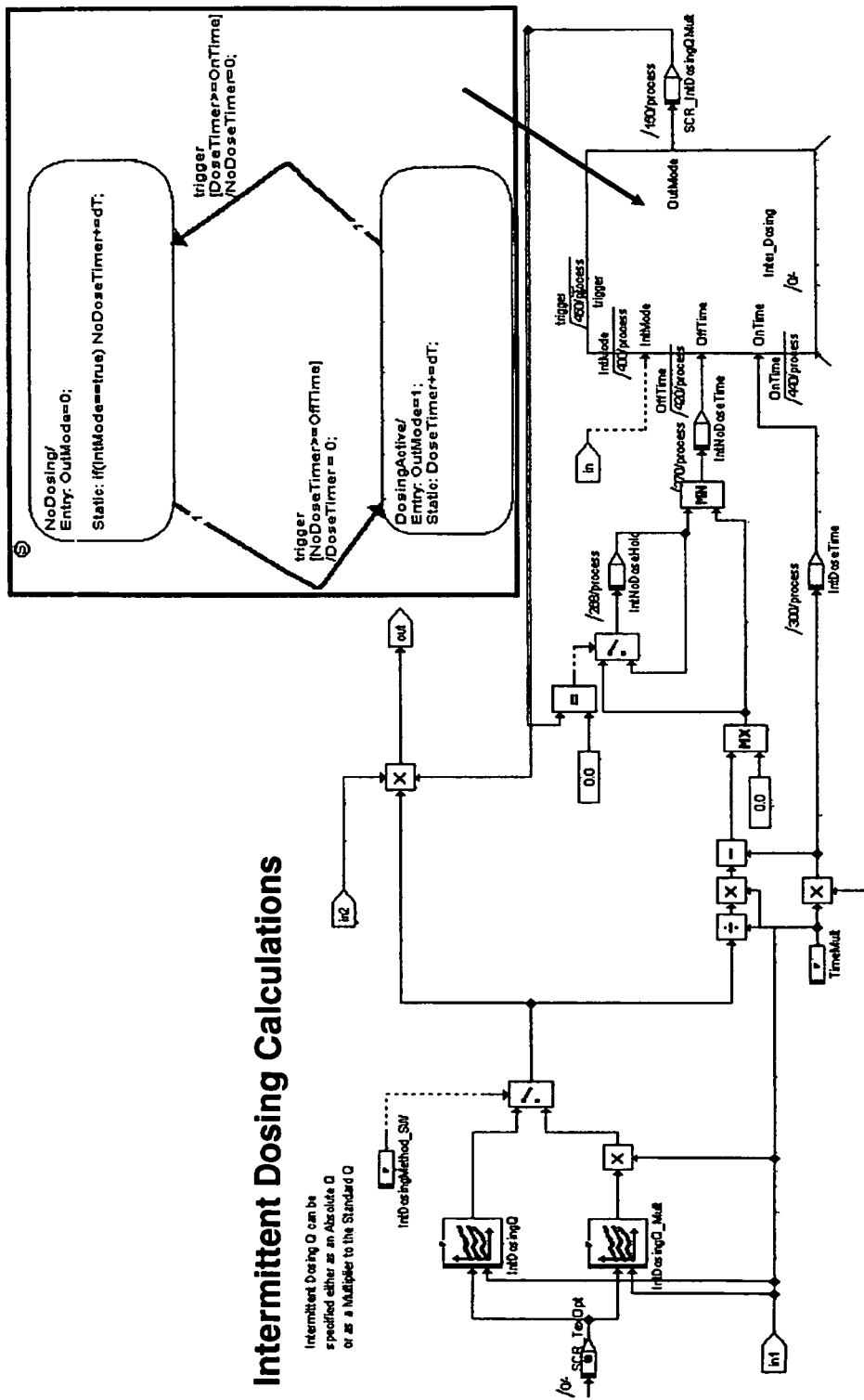
FIG. 9 is a block diagram of an intermittent dosing module in accordance with the present invention.
Figure 10:
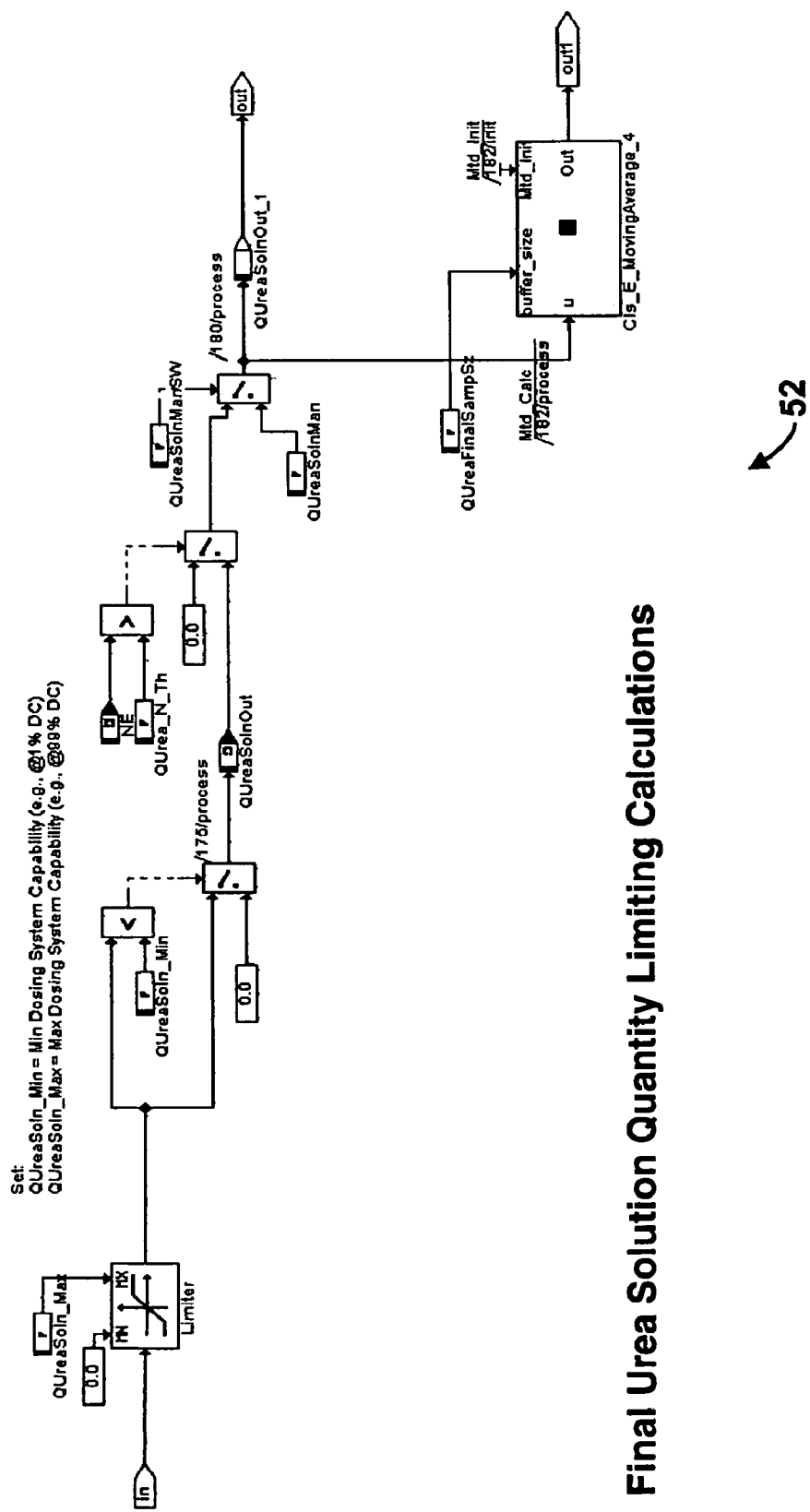
FIG. 10 is a block diagram of a final limit application module in accordance with the present invention.

In intermittent dosing module 50, the intermittent dosing quantity (QUreaSolnInt) is calculated. Turning now to FIG. 9, the intermittent calculation conducted in intermittent dosing module 50 uses a base lookup excess urea setpoint quantity from a table (IntDosingQ) or from a multiplier table (IntDosingQ_Mult) times the standard quantity (QUreaSolnStd) and a base on time, and calculates the off time based on the setpoint quantity. A timer algorithm then turns a bit On-1 and Off-0 according to the calculated on time and off time, and the bit is multiplied by the excess urea dosing quantity. Returning to FIG. 4, the main output of intermittent dosing module 50 is intermittent dosing quantity (QUreaSolnInt, g/hr).

In final limit application module 52, final limiting of the urea quantity occurs based on dosing system maximum and minimum flow information, and the urea setpoint quantity is passed back to MAIN where (QUreaSolnOutFinal, g/hr) is sent to the dosing system (through the Hardware Level I/O to the CAN Bus). Calcualtion of (QUreaSolnOutFinal, g/hr) is detailed in FIG. 10, with final limit application module 52 limiting the input quantity based on the minimum and maximum dosing system capabilities.

Figure 11:
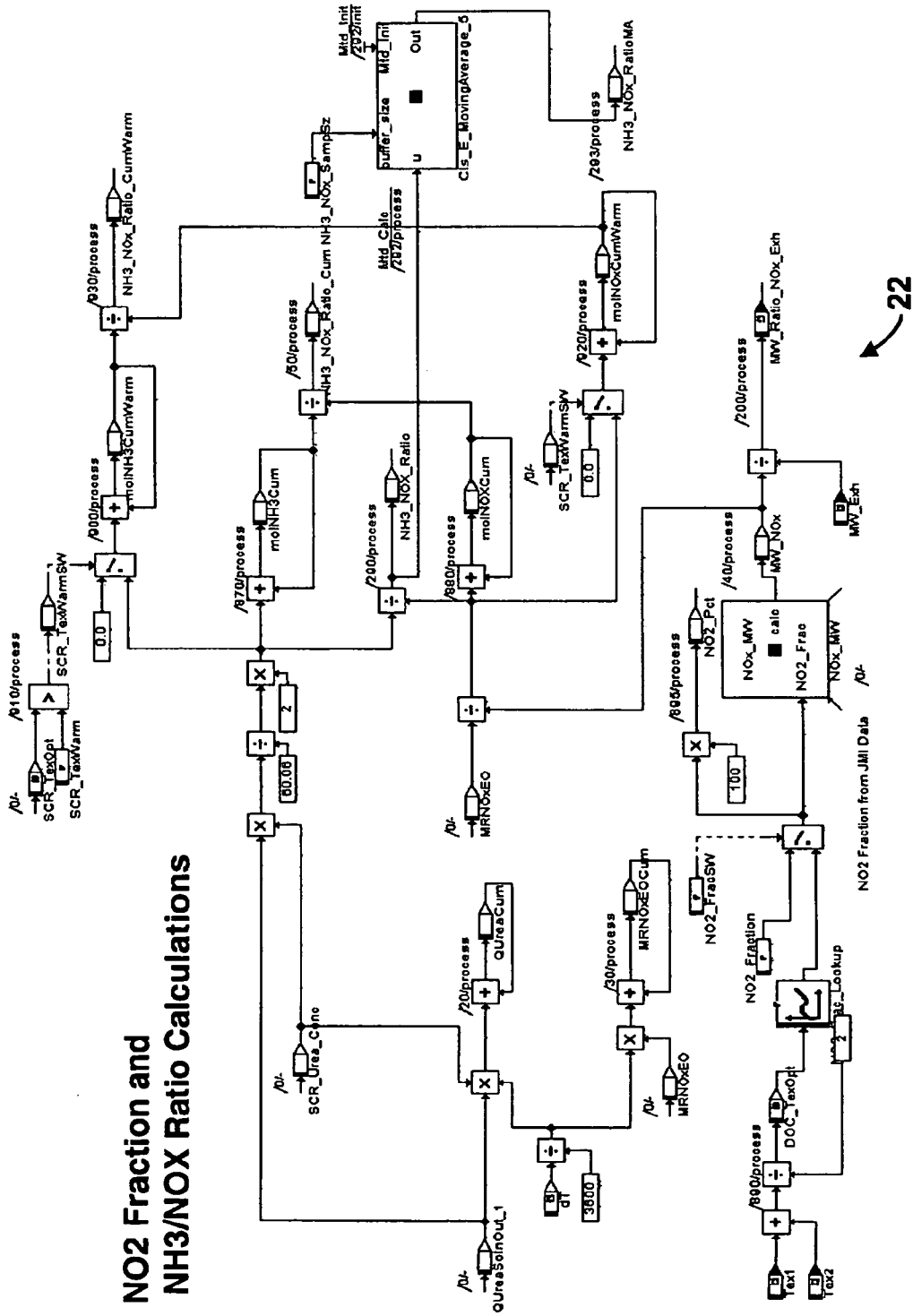
FIG. 11 is a block diagram of a concentration calculations module in accordance with the present invention.
Figure 12:
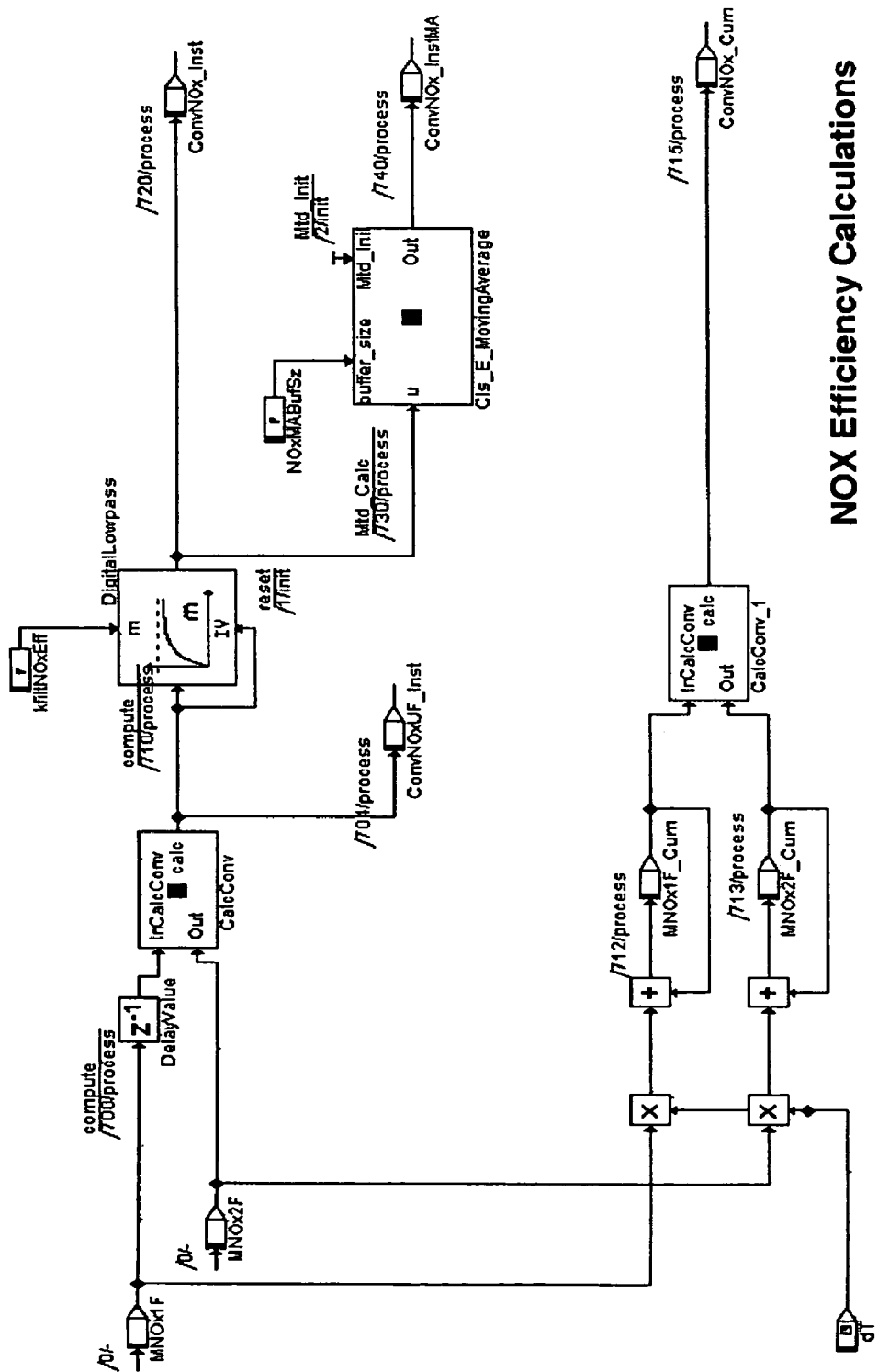
FIG. 12 is a block diagram of an efficiency calculations module in accordance with the present invention.
Figure 13B:
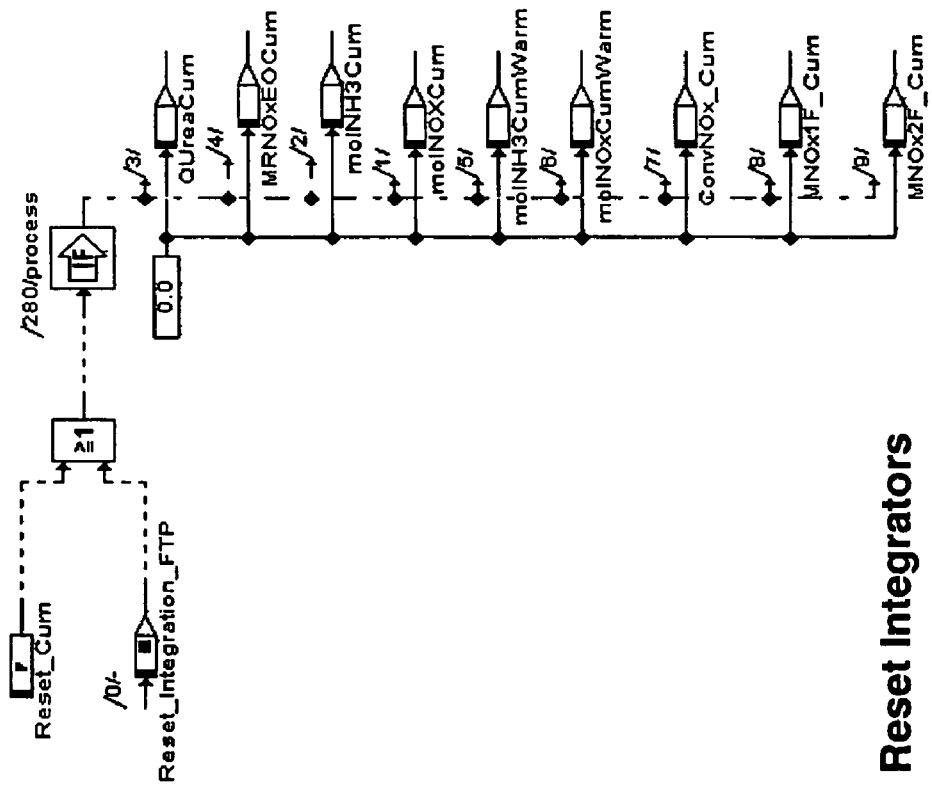
FIG. 13B is a block diagram of a reset integration module in accordance with the present invention.
Figure 13A:
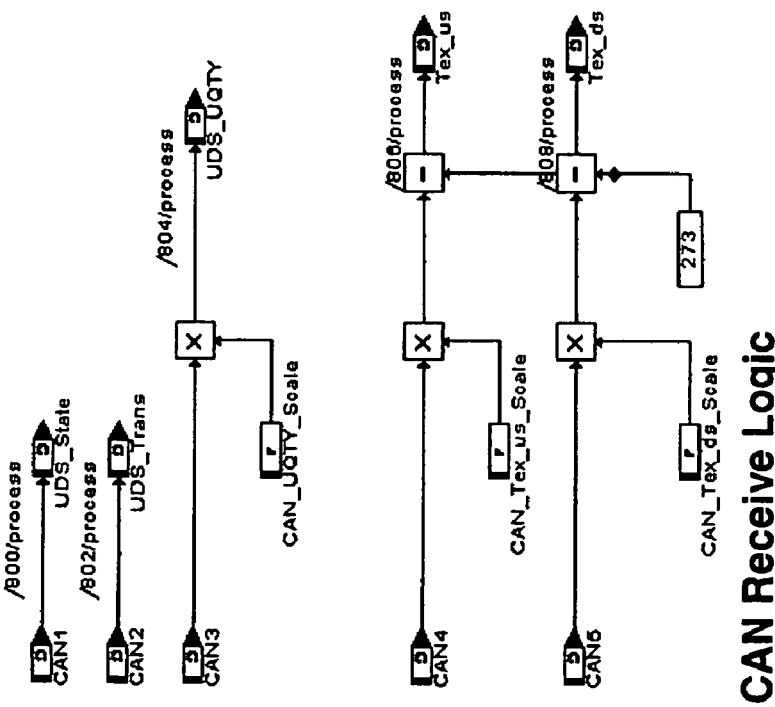
FIG. 13A is a block diagram of a CAN module in accordance with the present invention.

Returning to FIG. 4, other auxiliary modules exist to support the algorithms and testing, including concentration calculations module 22, efficiency calculations module 54, and reset integration module 58. Turning to FIG. 11, for example, in concentration calculations module 22, NO/NO2 fractions and instantaneous and cumulative NH3/NOx Molar Ratios are calculated. Also, turning to FIG. 12, efficiency calculations module 54 calculates instantaneous and cumulative NOx conversion efficiencies from pre and post SCR catalyst NOx sensors. Turning next to FIG. 13A, CAN module 56 further acquires CAN bus information from the dosing system and scales the acquired information. Yet further, FIG. 13B illustrates operation of reset integration module 58.

Figure 3:
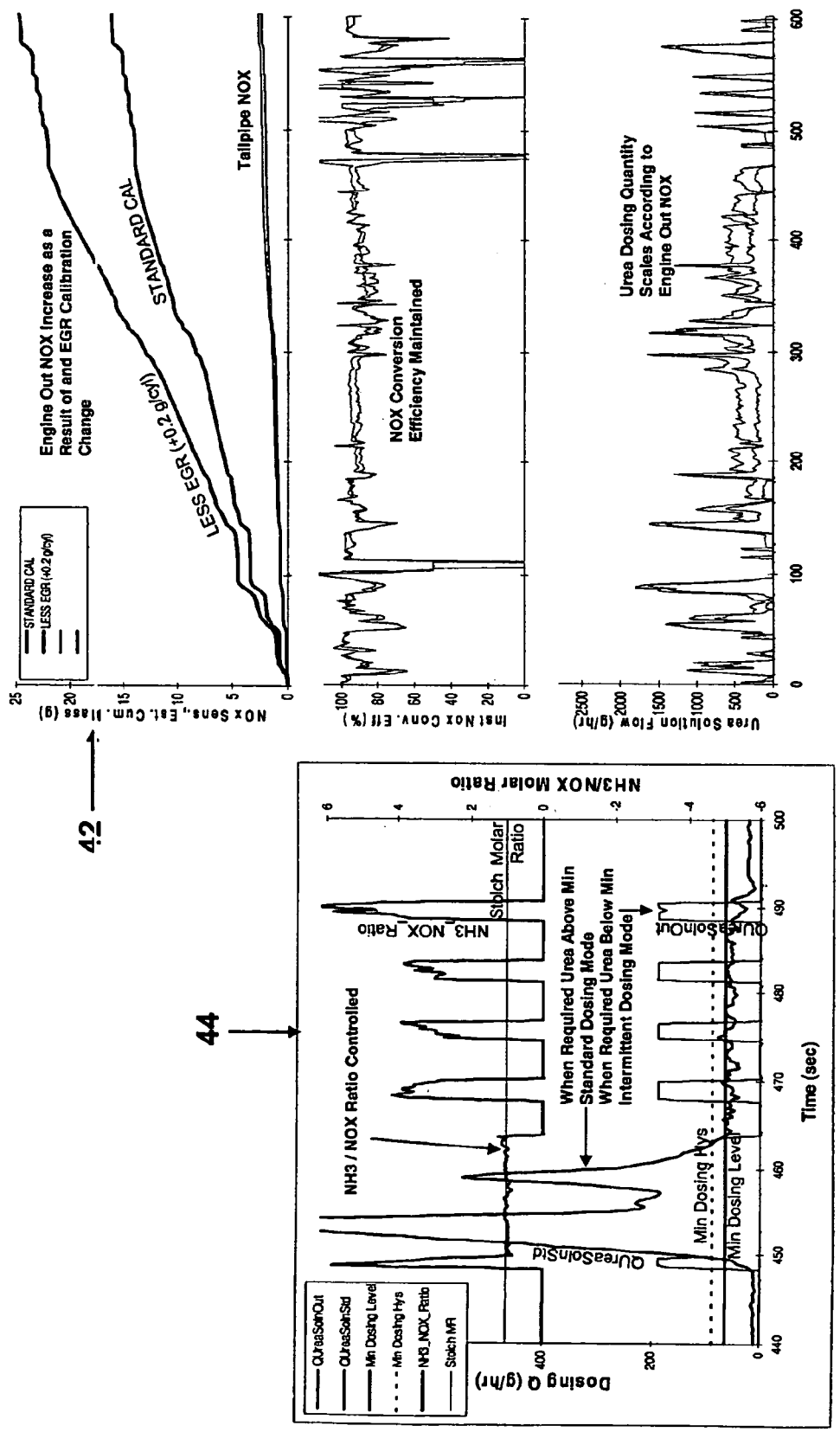
FIG. 3 is a set of graphs demonstrating reductant dosing control in accordance with the present invention.
Figure 4:
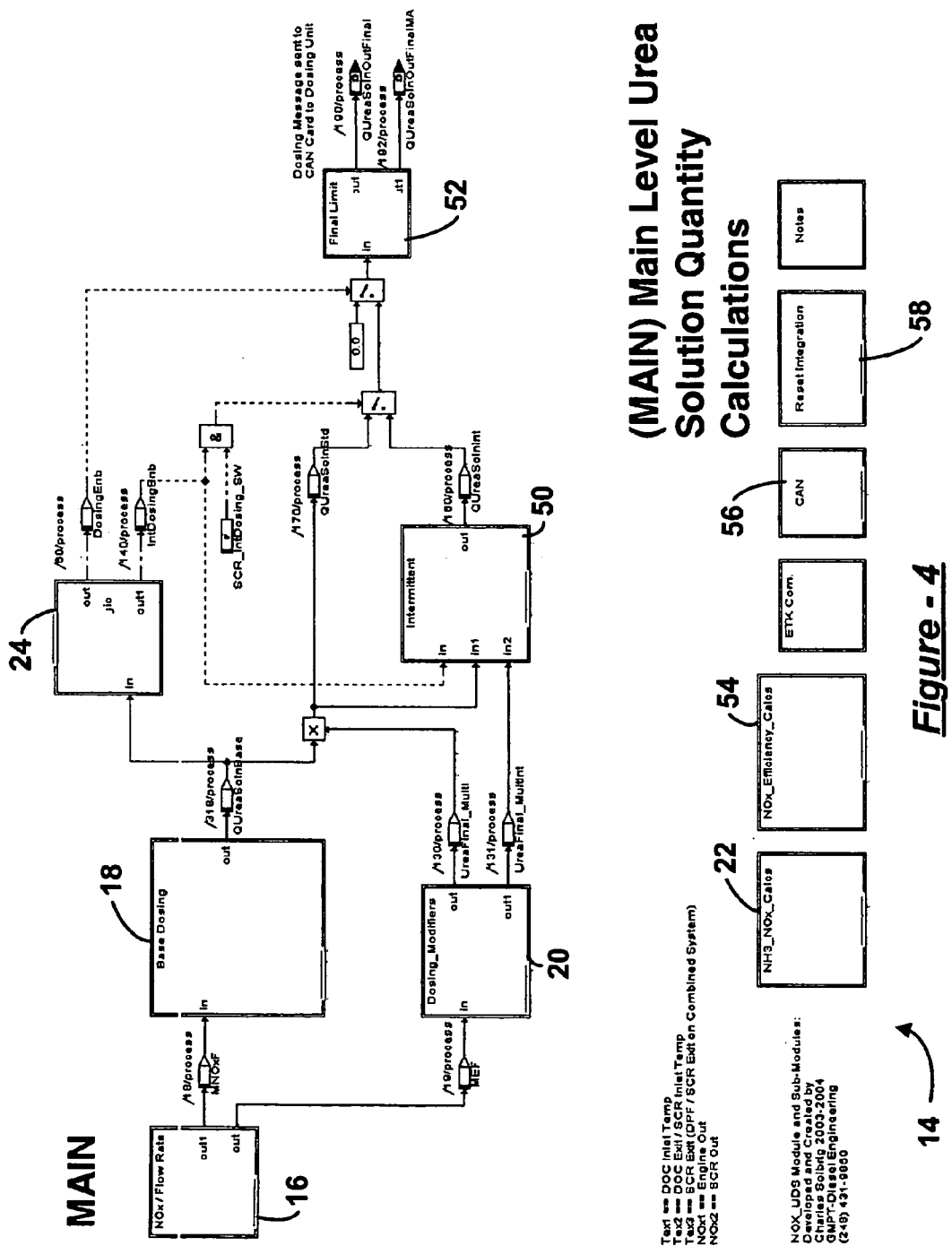
FIG. 4 is a block diagram of a reductant dosing control system in accordance with the present invention.

Results of SCR reductant dosing control according to the present invention are graphed in FIGS. 2 and 3. For example, dosing/no dosing line 38 delineates the FTP75 operating range 40. This range is extended as at 36 by use of intermittent dosing when the required reductant quantity falls below a minimum value that can be provided by constant dosing. Also, NOx sensor dosing control is graphed at 42, where urea quantity scales with the engine out NOx. Further, intermittent and constant dosing are graphed together at 44, with a switch occurring between modes according to the upper curve. It should be readily understood that intermittent dosing may be used exclusively in some embodiments, but that durations of no injection may reduce to zero at times when heavy reductant flow is required.

The NOx feedback control according to the present invention allows the urea dosing system to supply the correct amount of urea under all engine and catalyst operating conditions. Also, unusual engine operating conditions can be automatically accommodated, such as EGR malfunction and particulate filter regeneration. As a result, tail pipe ammonia can be minimized under most circumstances. Further, the dosing quantity self-adapts to the engine calibration, which facilitates the engine calibration process.

The intermittent dosing strategy also extends the capability of the urea dosing system to maintain $NH_3/NOx$ ratio during low NOx conditions by exploiting Zeolite catalyst $NH_3$ storage properties. It also allows the use of a higher concentration solution to cover both the Low Speed light Load (Low NOx), and the High Speed High Load (High NOx) conditions.

It is envisioned that additional algorithms may be added to allow the use of real time converter efficiency calculations or for On-Board Diagnostics (OBD) functionality (using 2 NOx sensors) and historical operational information to modify the set point dosing quantity from long term learned system behavior. It is also envisioned that the system and methods of the presently preferred embodiment may be modified to accommodate other reductants, such as pure anhydrous ammonia, aqueous ammonia, or any form of ammonia capable of being precisely metered. It should be readily understood that urea changes into $NH_3$ through decomposition reactions in the exhaust system. However, there are 2 moles of $NH_3$ available for every mole of urea, instead of just 1 for pure ammonia. Thus, the calculation changes slightly depending on whether there is NH3 or Urea and the concentration of the substance.

Those skilled in the art can now appreciate from the foregoing description that the broad teachings of the current invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A reductant dosing control system, for use in an SCR system of a motor vehicle, comprising:
   an input receiving a NOx feedback signal from an NOx sensor provided to said SCR system;
   a base dosing module calculating a quantity of required reductant to inject in front of a SCR catalyst of said SCR system based on the NOx feedback signal, wherein the SCR catalyst has ammonia storage properties;
   an intermittent dosing module calculating the quantity of reductant on an intermittent basis by using a base lookup excess urea quantity and a base on time and calculating an off time based on the required quantity of reductant; and
   an output signaling a reductant metering mechanism to periodically inject excess reductant based on the required quantity of reductant, including signaling the reductant metering mechanism to intermittently inject reductant according to the base on time, the off time, and the quantity of reductant by turning a bit on and off according to the base on time and the off time and multiplying the bit by the quantity of reductant;
   wherein a period of injection controlled by the base on time has a predetermined length, while a rate of injection controlled by a set point and a duration of no injection controlled by the off time are variable.

2. The system of claim 1, further comprising an enable logic module making a determination whether a reductant dosing system of said SCR system is capable of supplying the quantity of reductant under present circumstances, and selectively communicating a set point dosing quantity reflecting the quantity of reductant to the reductant dosing system based on results of the determination.

3. The system of claim 1, wherein said input receives sensory signals from engine mass airflow sensors of said motor vehicle and temperature sensors of said SCR system, the system further comprising a dosing modification module calculating modifiers based on the sensory signals to tailor the quantity of reductant to physical conditions of the engine and catalyst, including temperature and space velocity, and modifying the quantity of reductant for engine and catalyst operating conditions according to the modifiers.

4. The system of claim 1, further comprising an NOx flow rate determination module converting a PPM signal from the NOx sensor to a mass per time NOx flow rate signal using air flow rate, fuel flow rate, and NOx molecular weight, wherein said base dosing module is adapted to calculate a stoichiometric dosing amount of urea for a 32.5% urea/water solution, including calculating the dosing amount from the NOx flow rate using a urea to ammonia decomposition property and molecular weights of Urea and NOx, to correct the stoichiometric dosing amount for additional dilution with water, and to filter the amount to reduce noise, thereby determining a set point dosing quantity.

5. The system of claim 1, further comprising a concentration calculations module estimating NO/NO2 fraction based on oxidation catalyst (DOC) properties.

6. The system of claim 1, further comprising a concentration calculations module calculating $NH_3$/NOx molar ratios.

7. A reductant dosing control method, for use in an SCR system of a motor vehicle, comprising:
   receiving a NOx feedback signal from an NOx sensor provided to said SCR system;
   calculating a required quantity of reductant to inject in front of a SCR catalyst of said SCR system based on the NOx feedback signal, wherein the SCR catalyst has ammonia storage properties; and
   periodically supplying an excess amount of reductant based on the required quantity of reductant;
   calculating the quantity of reductant on an intermittent basis, including using a base lookup excess urea quantity and a base on time and calculating an off time based on the quantity of reductant; and
   intermittently injecting reductant according to the base on time, the off time, and the quantity of reductant, including turning a bit on and off according to the base on time and the off time and multiplying the bit by the quantity of reductant,
   wherein a period of injection controlled by the base on time has a predetermined length, while a rate of injection controlled by a set point and a duration of no injection controlled by the off time are variable.

8. The method of claim 7, further comprising:
   making a determination whether a reductant dosing system of said SCR system is capable of supplying the quantity of reductant under present circumstances;
   selectively communicating a set point dosing quantity reflecting the quantity of reductant to the reductant dosing system based on results of the determination.

9. The method of claim 7, further comprising:
   receiving sensory signals from engine mass airflow sensors of said motor vehicle and temperature sensors of said SCR system;
   calculating modifiers based on the sensory signals to tailor the quantity of reductant to physical conditions of the engine and catalyst, including temperature and space velocity; and
   modifying the quantity of reductant for engine and catalyst operating conditions according to the modifiers.

10. The method of claim 7, further comprising:
    converting a PPM signal from the NOx sensor to a mass per time NOx flow rate signal using air flow rate, fuel flow rate, and NOx molecular weight;
    calculating a stoichiometric dosing amount of urea for a 32.5% urea/water solution, including calculating the dosing amount from the NOx flow rate using a urea to ammonia decomposition property and molecular weights of Urea and NOx; and
    correcting the stoichiometric dosing amount for additional dilution with water, and filtering the amount to reduce noise, thereby determining a set point dosing quantity.

11. The method of claim 7, further comprising estimating NO/NO2 fraction based on oxidation catalyst (DOC) properties.

12. The method of claim 7, further comprising calculating $NH_3$/NOx molar ratios.

13. A selective catalytic reduction system for use in a motor vehicle, comprising:
    a Zeolite based catalyst resident in an exhaust system receptive of NOx exhaust exiting a diesel engine;
    a supply of reductant;
    a reductant dosing mechanism adapted to inject reductant into the exhaust system before the catalyst according to a variable reductant dosing setpoint;
    an NOx feedback sensor supplying a NOx feedback signal indicating an amount of NOx exhaust exiting the diesel engine; and
    a reductant dosing control system adapted to calculate a required quantity of reductant to inject in front of the Zeolite based SCR catalyst based on the NOx feedback signal, to modify the quantity of reductant based on sensory signals from engine mass airflow sensors of said diesel engine and temperature sensors of the enclosure, and to communicate a reductant set point to said reductant dosing mechanism based on the required quantity of reductant,
    wherein said reductant dosing control system is adapted to control said reductant dosing mechanism to intermittently inject excess reductant into the exhaust system before the catalyst for periods of time separated by durations of no injection, wherein at least one of the periods of time and the durations are calculated based on the required quantity of reductant, and
    wherein said reductant dosing control system is adapted to compare the required quantity of reductant to a reductant quantity associated with constant operation of said dosing mechanism at a minimum setpoint.

14. The system of claim 13, wherein said reductant dosing control system is adapted to estimate NO/NO2 fraction, and to calculate $NH_3$/NOx molar ratios.

15. The system of claim 14, wherein said reductant dosing control system is adapted to convert a PPM signal from the NOx sensor to a mass per time NOx flow rate signal using air flow rate, fuel flow rate, and NOx molecular weight, calculate a stoichiometric dosing amount of urea for a 32.5% urea/water solution, including calculating the dosing amount from the NOx flow rate using a urea to ammonia decomposition property and molecular weights of Urea and NOx, correct the stoichiometric dosing amount for additional dilution with water, and filter the amount to reduce noise, thereby determining a base set point dosing quantity.

16. The system of claim 13, wherein a base on time is employed for the period, and the set point and the duration are periodically calculated as a function of quantity of reductant.

* * * * *